(12) United States Patent
Hobbs et al.

(10) Patent No.: US 12,481,298 B2
(45) Date of Patent: Nov. 25, 2025

(54) CONTROL SYSTEM FOR ONE OR MORE ABLUTIONARY DEVICES

(71) Applicant: Kohler Mira Limited, Gloucesterhire (GB)

(72) Inventors: Barry Steven Hobbs, Cheltenham (GB); Mark Frederick Florencio Barton, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 88 days.

(21) Appl. No.: 17/502,779

(22) Filed: Oct. 15, 2021

(65) Prior Publication Data
US 2022/0121229 A1    Apr. 21, 2022

(30) Foreign Application Priority Data
Oct. 19, 2020  (GB) ...................... 2016539

(51) Int. Cl.
| | | |
|---|---|---|
| *G05D 23/13* | (2006.01) | |
| *E03C 1/02* | (2006.01) | |
| *E03C 1/04* | (2006.01) | |

(52) U.S. Cl.
CPC ......... *G05D 23/1393* (2013.01); *E03C 1/023* (2013.01); *E03C 1/041* (2013.01); *G05D 23/1353* (2013.01); *E03C 1/0408* (2013.01)

(58) Field of Classification Search
CPC ................ F16K 11/22; F16K 11/24
(Continued)

(56) References Cited

U.S. PATENT DOCUMENTS 4,330,081 A * 5/1982 McMillan .......... G05D 23/1393
                                                         68/12.22
4,420,811 A   12/1983 Tarnay et al.
(Continued)

FOREIGN PATENT DOCUMENTS

| CN | 101293231 A | 10/2008 |
|---|---|---|
| CN | 105527915 A | 4/2016 |

(Continued)

OTHER PUBLICATIONS

GB Combined Search and Examination Report on GB Patent No. 2016539.5 dated Apr. 20, 2021; 5 pages.
(Continued)

*Primary Examiner* — Jianying C Atkisson
*Assistant Examiner* — Meraj A Shaikh
(74) *Attorney, Agent, or Firm* — Husch Blackwell LLP

(57) ABSTRACT

A control system for one or more ablutionary devices includes a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller. The controller is configured obtain one or more current operating signals related to the flow rate of the output stream produced by the mixer valve and compare each of the one or more current operating signals to a corresponding historical operating signal, the historical operating signal being an operating signal previously obtained by the controller, and to generate a diagnostic signal based on the comparison.

23 Claims, 5 Drawing Sheets

(58) Field of Classification Search
USPC .............................................. 236/12.1, 12.15
See application file for complete search history.

(56) References Cited

U.S. PATENT DOCUMENTS

| | | | |
|---|---|---|---|
| 4,682,728 A * | 7/1987 | Oudenhoven | G05D 23/1393 700/285 |
| 5,058,804 A | 10/1991 | Yonekubo et al. | |
| 5,358,177 A * | 10/1994 | Cashmore | G05D 23/1393 137/332 |
| 7,254,518 B2 | 8/2007 | Eryurek et al. | |
| 10,533,770 B1 | 1/2020 | O'Keeffe et al. | |
| 2005/0072239 A1* | 4/2005 | Longsdorf | G05B 23/027 702/56 |
| 2007/0228181 A1* | 10/2007 | Robinson | D06F 33/47 236/12.11 |
| 2010/0206956 A1* | 8/2010 | Gautschi | E03C 1/0412 236/12.12 |
| 2011/0114187 A1 | 5/2011 | Sawaski | |
| 2012/0227821 A1 | 9/2012 | Stimpson | |
| 2013/0091628 A1 | 4/2013 | Son et al. | |
| 2013/0340162 A1 | 12/2013 | Peel | |
| 2016/0370216 A1 | 12/2016 | Cummins et al. | |
| 2017/0314282 A1* | 11/2017 | Nix | C02F 1/008 |
| 2017/0350101 A1 | 12/2017 | Lee et al. | |
| 2018/0024574 A1 | 1/2018 | Goodjohn et al. | |
| 2018/0094413 A1 | 4/2018 | Chaky | |
| 2018/0163993 A1 | 6/2018 | Goodjohn et al. | |
| 2018/0364087 A1 | 12/2018 | Geller et al. | |

FOREIGN PATENT DOCUMENTS

| | | | |
|---|---|---|---|
| EP | 0 457 486 | 11/1991 | |
| EP | 1377768 B1 | 12/2006 | |
| JP | 2000-214916 A | 8/2000 | |
| WO | WO-02084155 A1 * | 10/2002 | .......... F16K 37/0091 |
| WO | WO-2007/007093 A2 | 1/2007 | |
| WO | WO-2019/138027 A1 | 7/2019 | |

OTHER PUBLICATIONS

United Kingdom Official Action dated Oct. 26, 2022, issued in corresponding United Kingdom application.
European Search Report dated Jan. 9, 2023 issued in corresponding European application.
Chinese Official Action dated Dec. 26, 2023 issued in corresponding Chinese application.

* cited by examiner

CONTROL SYSTEM FOR ONE OR MORE ABLUTIONARY DEVICES

CROSS-REFERENCE TO RELATED PATENT APPLICATIONS

The present application claims priority to and the benefit of United Kingdom Application No. GB 2016539.5, filed Oct. 19, 2020, the entire disclosure of which, including the specification, drawings, claims, and abstract, is incorporated herein by reference.

BACKGROUND

The present application relates to a control system for one or more ablutionary devices such as a shower system, a tap, faucet or the like or any combination of such ablutionary devices. The present application also relates to a method performed by such a control system. More specifically, the present application relates to the control of an electronically controlled ablutionary device such as a digital shower or tap.

Electronically controlled, or digital, showers and taps can include a mixer valve unit that is provided with a cold water and a hot water input from which a blended output stream is produced in response to an electrical control signal. A temperature sensor can be used in the output stream to create a feedback loop in order to control the temperature of the output stream by blending appropriate levels of the input hot and cold water. The feedback loop is used to maintain the output stream at a target temperature.

In a digital shower or tap system the temperature and flow of the output stream can be controlled remotely by the user with a separate user interface. This is usually located remotely from the mixer valve unit so that the mixer valve unit and user interface form a control system. The user interface allows the user to set a desired water output property, such as the desired temperature and/or flow rate, and can provide more complex control functionality such as allowing pre-programmed or custom shower experiences to be provided.

Digital shower/tap systems have a number of advantages in terms of improved functionality and user experience by giving greater and more convenient control of the output water stream. Efficient operating of the shower/tap system is however reliant on there being no undesired blockages or restriction of the water flow that develop over time. This may be caused by a build-up of deposits in outlet holes or filters, or may be caused by the retro-fitting of outlet diverters or flow restrictors by the user. If flow is restricted compared to that available when the system was designed, installed or calibrated there will likely be a loss of performance, such as incorrect temperature control.

A general problem to be addressed therefore is how to avoid the loss of performance of an ablutionary device such as a digital shower/tap caused by restricted water flow.

SUMMARY

An exemplary embodiment relates to a control system for one or more ablutionary devices that includes a mixer valve having a first inlet and a second inlet configured to receive a supply of hot and cold water, and an outlet configured to output cold water, hot water, or a mixture thereof as an output stream for suppling water to the one or more ablutionary devices downstream of the mixer valve. The control system also includes a controller configured to obtain one or more current operating signals related to a flow rate of the output stream produced by the mixer valve; and compare each of the one or more current operating signals to a corresponding historical operating signal, the historical operating signal being an operating signal previously obtained by the controller; and generate a diagnostic signal based on the comparison Another exemplary embodiment relates to a method performed by the control system of an ablutionary device, the control system including a mixer valve having a first inlet and a second inlet configured to receive a supply of hot and cold water, and an outlet configured to output cold water, hot water, or a mixture thereof as an output stream for suppling water to the one or more ablutionary devices downstream of the mixer valve. The method includes obtaining one or more current operating signals related to the flow rate of the output stream produced by the mixer valve; comparing each of the one or more current operating signals to a corresponding historical operating signal, the historical operating signal being a previously obtained operating signal; and generating a diagnostic signal based on the comparison.

BRIEF DESCRIPTION OF THE DRAWINGS

Embodiments of the invention will now be described, by way of example only, with reference to the accompanying drawings, in which.

DETAILED DESCRIPTION

Figure 1:
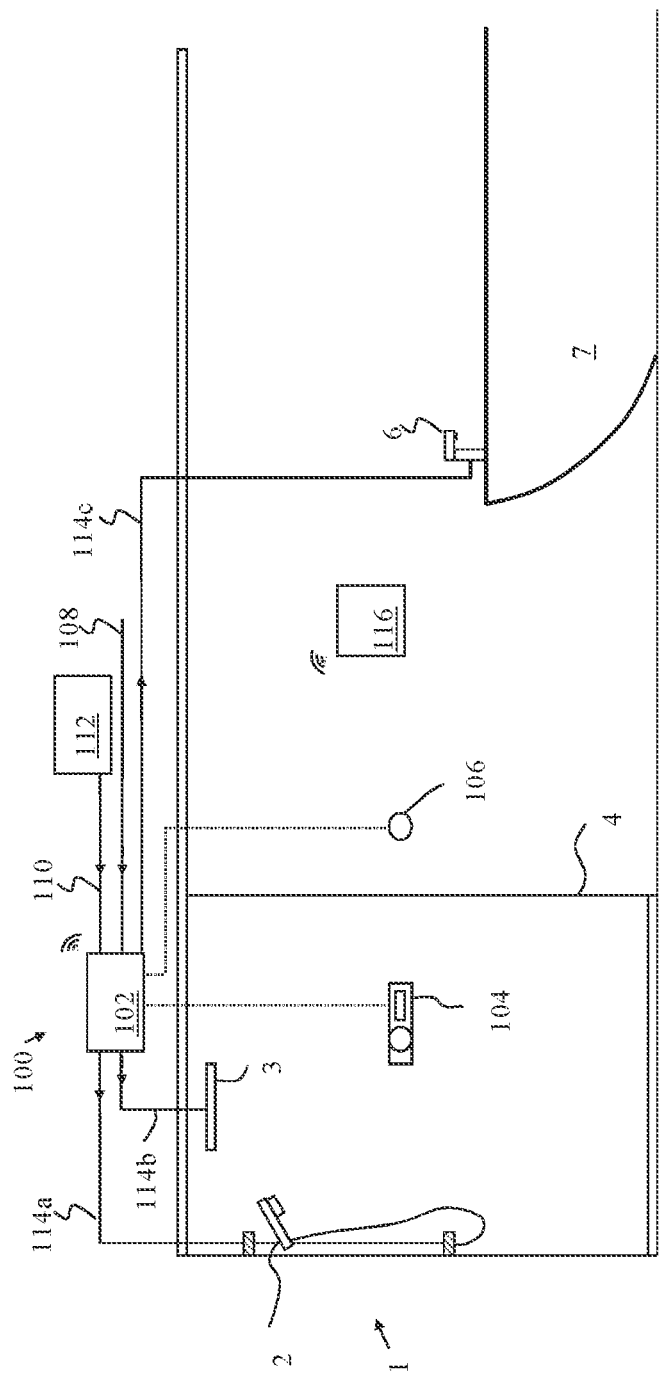
FIG. 1 shows a schematic side view of an ablutionary device having a control system according to an embodiment.

A first aspect provides a control system for one or more ablutionary devices, comprising any one or more of:
 a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and
 a controller configured to:
  obtain one or more current operating signals related to the flow rate of the output stream produced by the mixer valve; and
  compare each of the one or more current operating signals to a corresponding historical operating signal, the historical operating signal being an operating signal previously obtained by the controller; and
  generate a diagnostic signal based on the comparison.

By comparing the current operating signal with a corresponding historical operating signal a change over time can be detected to provide an indirect indication that there is some form of restriction to the flow. The diagnostic signal can be used to provide an indication of whether a blockage has occurred, or that a flow restricting device has been install, and appropriate action taken.

The control system may further comprise a flow rate sensor arranged to generate a flow rate signal indicative of the rate of flow of water flowing in the output stream, wherein the one or more current operating signals may include a current flow rate signal obtained from the flow rate sensor and the corresponding historical operating signal is a historical flow rate signal previously obtained from the flow rate sensor.

The controller may be configured to generate the diagnostic signal if the comparison indicates that the current flow rate is less than, or less than a threshold proportion of, the historical flow rate.

The mixer valve may comprise first and second valve members forming first and second flow control valves arranged to control flow between the inlets and the outlet. The controller may be configured to control the position of the valve members in order to control the output stream. The one or more operating signals may include a current target or current actual position of the first, second or both of the valve members. The corresponding historical operating signal is a corresponding historical target or actual position of the first, second or both of the valve members.

The controller may be configured to generate the diagnostic signal if the comparison indicates that the first, second or both control valves are currently open more than, or greater than a threshold amount more than, at the corresponding historical target or actual positions of the valve members.

The controller may be arranged to store at least one operating signal to act as a historical operating signal in order to perform the comparison.

The controller may be configured to store the current operating signal on which the comparison is based to act as a historical operating signal for use in later comparisons.

The current operating signal may have an associated operating condition, and wherein the controller may be arranged to compare a current operating signal with a historical operating signal that has the same or similar associated operating condition.

The historical operating signal on which the comparison is based may relate to operation of the ablutionary device during the installation and/or calibration of the control system and ablutionary device.

The controller may be further configured to control the mixer valve in response to the diagnostic signal.

The controller may be arranged to control the mixer valve to at least temporarily reduce the flow rate or target flow rate of hot and/or cold water through the mixer valve or change the one or more target output water properties in response to the diagnostic signal.

The controller may be arranged to send or transmit the diagnostic signal. The controller may be configured to send the diagnostic signal to a user interface and/or a remote device for display and/or storage. The controller may be configured to send the diagnostic signal via a wireless connection or via a wired connection.

The controller may be arranged to send the diagnostic sign over a wireless network to a server at a location remote from the control system.

The controller may further comprise a memory. The controller may be arranged to store the diagnostic signal in the memory.

The control system may comprise a plurality of outlets, each configured to output water from the mixer valve, the plurality of outputs being configured to supply multiple water outlets of the same ablutionary device and/or a plurality of ablutionary devices.

The control system may further comprise one or more shut-off valves (e.g. formed by solenoids) each arranged to control the flow in each of the outlets. The one or more shut-off valves may be activated in response to the diagnostic signal.

A pipework manifold may be provided downstream of the mixer valve at which the output stream is divided amongst separate conduits for each water output.

In a second aspect there is provided a method performed by the control system of an ablutionary device, the control system comprising a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve, the method comprising: obtaining one or more current operating signals related to the flow rate of the output stream produced by the mixer valve; and comparing each of the one or more current operating signals to a corresponding historical operating signal, the historical operating signal being a previously obtained operating signal; and generating a diagnostic signal based on the comparison.

The one or more current operating signals may include a current flow rate signal indicative of the rate of flow of water flowing in the output stream and the corresponding historical operating signal may be a historical flow rate signal of the output stream.

The diagnostic signal may be generated if the comparison indicates that the current flow rate is less than, or less than a threshold proportion of, the historical flow rate.

The mixer valve may comprise first and second valve members forming first and second flow control valves arranged to control flow between the inlets and the outlet. The one or more operating signals may include a current target or current actual position of the first, second or both of the valve members. The corresponding historical operating signal may be a corresponding historical target or actual position of the first, second or both of the valve members.

The diagnostic signal may be generated if the comparison indicates that the first, second or both flow control valves are currently open more than, or greater than a threshold amount more than, at the corresponding historical target or actual valve member positions.

The method may further comprise storing at least one operating signal to act as a historical operating signal in order to perform the comparison.

Storing the at least one operating signal may comprise storing the current operating signal on which the comparison is based to act as a historical operating signal for use in later comparisons.

The current operating signal may have an associated operating condition, and wherein comparing the one or more current operating signals may comprise comparing a current operating signal with a historical operating signal that has the same or similar associated operating condition.

The historical operating signal on which the comparison is based may relate to operation of the ablutionary device during the installation and/or calibration of the control system and ablutionary device.

The method may further comprise controlling the mixer valve in response to the diagnostic signal.

Controlling the mixing valve may comprise controlling the mixer valve to at least temporarily reduce the flow rate or target flow rate of hot and/or cold water through the mixer valve or change the one or more target output water properties in response to the diagnostic signal.

The method may comprise sending or transmitting the diagnostic signal. The method may comprise sending the diagnostic signal to a user interface and/or a remote device for display and/or storage. Sending the diagnostic signal may comprise sending the diagnostic signal via a wireless connection or via a wired connection.

The method may comprise sending the diagnostic signal over a wireless network to a server.

The method may further comprise storing the diagnostic signal in a local memory of the controller.

The skilled person will appreciate that except where mutually exclusive, a feature described in relation to any one of the above aspects may be applied to any other aspect.

FIG. 1 illustrates a first ablutionary device 1 that is in the form of a shower system. The shower system comprises two water outlets: a first water outlet that is a wall mounted shower head 2 and a second water outlet that is an overhead shower head 3. The water outlets are mounted within a shower enclosure 4. FIG. 1 also shows a second ablutionary device in the form of a spout 6 that provides water to a bath tub 7.

Although three water outlets are shown in FIG. 1 (the spout, overhead shower head and wall mounted shower head), other numbers may be provided. For example, the shower system 1 may have only a single water outlet (e.g. a single shower head or spout) or may have three or more water outlets (e.g. additional mid-level shower heads). The present application relates to other types of ablutionary device which may, for example, be a tap (e.g. faucet) provided for a sink, wash basin, or other similar purpose. In yet other embodiments, each ablutionary device may be a mixture of both taps and shower heads. In some embodiments, the bath tub and shower may be combined (e.g. so that the shower is an over-bath shower).

FIG. 1 further shows a control system 100 that provides a controlled supply of water to the various water outlets of the shower system and bath tub. The control system may therefore be termed a control and supply system. In the embodiment shown in FIG. 1, the control system 100 provides a controlled water supply to two separate ablutionary devices. In other embodiments, any other number of ablutionary devices may be supplied and controlled, e.g. only one or three or more. For example, the control system may be connected to only a shower system or only a spout.

The supply of water is blended from a hot and cold water supply to give the desired water temperature. The control system 100 generally comprises a mixer valve unit 102, a user interface 104, and a remote on/off control 106. The mixer valve unit 102 receives a supply of cold water via a cold water conduit 108 coupled to the plumbing system of the building in which the shower system 1 is located. The cold water conduit provides a suitable supply of cold water. In some embodiments, the cold water supply is provided from a mains cold water supply or may instead be provided from a water tank such as a header tank (not shown in the figures). The mixer valve unit 102 also receives a supply of hot water via a hot water conduit 110 coupled to the plumbing system. The hot water conduit provides a supply of water that has been heated by a water heater 112 provided as part of the plumbing system. The water heater 112 may be an instantaneous water heater (such as a combi-boiler) or a storage water heater. Any other suitable water heater may be used. The mixer valve unit 102 supplies thee output conduits 114a, 114b, 114c with a blended water stream produced by mixing the cold and hot water supplies as will be described in more detail later. The output conduits 114a, 114b, 114c are fluidly coupled to the water outlets 2, 3, 6 of the ablutionary devices 1, 6. The mixer valve unit 102 may have any suitable number of water outlets so that a variety of different forms of ablutionary device (having various numbers of water outlets as described above) can be supplied. In some embodiments, the mixer valve unit may have more water outputs than necessary for the ablutionary device or devices being supplied. Any such redundant outlets may be capped-off if not required.

The user interface 104 is mounted within the shower enclosure 4, and is arranged to display information to the user and receive user input to control the shower system. The remote on/off control 106 is located outside of the shower enclosure to allow the user to turn the shower on and off before entering the enclosure 4. In other embodiments, a separate remote on/off control 106 may not be provided, and the shower turned on and off from the user interface 104. A separate user interface may be provided on the bath spout 6 (not visible in the Figures) to allow the flow of water from the spout to be controlled.

The control system 100 may further include, or may be adapted to communicate with, a portable user device 116 that may be used to remotely control the shower system. The portable user device 116 may be a dedicated device, or may take the form of a smart phone or the like on which a suitable application can be installed to interface with the control system 100. The portable user device 116 is in wireless communication with the mixer valve unit 102 via any suitable wireless connection such as Bluetooth or via a WiFi network. In the embodiment shown in FIG. 1, the parts of the control system 100 remote from the mixer valve unit 102 have a wired connection to it. In other embodiments, a wired or wireless connection can be used between any separate parts of the control system 100. For example, the user interface 104 and remote on/off control 106 may be wirelessly connected.

The mixer valve unit 102 may be located within a loft or floor space generally above the shower system. In other embodiments, the mixer valve unit 102 may be located in any other suitable location, such as underneath the bath or in a cupboard.

Figure 2:
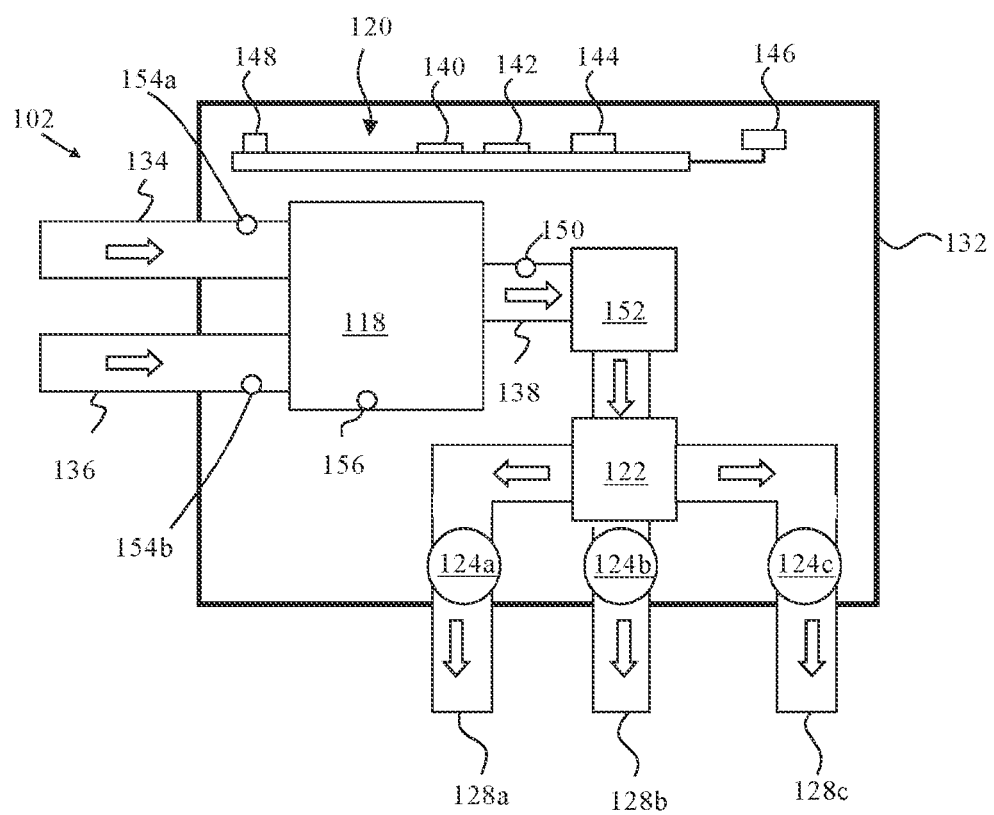
FIG. 2 shows a close-up schematic view of a mixer valve unit forming part of the control system shown in FIG. 1.

Referring now to FIG. 2, the mixer valve unit 102 is shown in more detail. The mixer valve unit 102 generally comprises: a mixer valve 118; a controller 120; a pump 122; first, second and third flow shut-off valves 124a, 124b, 124c; and first, second and third water outlets 128a, 128b, 128c. These components are mounted within a housing 132. Water flow through the mixer valve unit 102 is illustrated by the arrows in FIG. 2. The water carrying conduits, and the path taken by them, shown in FIG. 2 is a schematic example only to illustrate the general flow of water through the mixer valve unit 102. The water carrying conduits may have any suitable size and shape as required to allow for adequate water flow and mounting within the housing 132.

In the presently described embodiment, the mixer valve comprises first and second water inlets 134, 136, each of which is arranged to receive a supply of hot or cold water. Either one the inlets 134, 136 may be coupled to a hot or cold water supply, with the other inlet being coupled to the other of the hot and cold water supplies. In the presently described embodiment, the first water inlet 134 is coupled to the hot water conduit 110 and is referred to as the hot water inlet. The second water inlet 136 is coupled to the cold water conduit 108 and is referred to as the cold water inlet.

The mixer valve further comprises an outlet 138 that is configured to output cold water, hot water or a mixture thereof as an output stream for suppling water to the ablutionary devices 1,6 downstream of the mixer valve 118. The mixer valve 118 comprises one or more valves members that are movable to vary the rate of water flow between the hot and cold inlets and the outlet to control the blended stream. An example of a mixer valve 118 suitable for use in the mixer valve unit 102 will be described in more detail later.

The blended stream produced by the mixer valve 118 flows through the mixer valve outlet 138 (via a flow rate sensor as will be described later) to the pump 122. The pump 122 is also arranged to separate the blended stream into separate output flows. Each of these separate flows is used to supply each of the water outlets provided by the ablutionary device(s) (e.g. the wall mounted and overhead shower heads 2, 3 and bath spout 6). Although three separate output flows are produced by the pump in FIG. 2, any suitable number of outputs may be provided by splitting the blended stream into a suitable number of separate flows. If only one output from the mixer valve unit 102 is required the pump has a single input and output.

The separate output flows from the pump 122 flow through the first, second and third shut-off valves 124a, 124b, 124c respectively. The shut-off valves are each moveable between a closed and open state to provide independent control of water flowing to each water outlet of the ablutionary device(s). This may allow the user to choose which water outlets they wish to use, and independently control the flow rate through each one in a range between the maximum flow provided by the mixer valve 118 and zero flow. The shut-off valves may be solenoid valves. Other types of shut-off valves may however be used. Each output of the mixer valve unit may be provided with a respective shut-off valve. In yet other embodiments, the shut-off valves may not be provided.

The shut-off valves 124a, 124b, 124c are fluidly coupled to respective first, second and third water outlets 128a, 128b, 128c. The first and second outlets 128a, 128b are fluidly coupled to the output conduits 114a, 114b to supply the water outlets of the shower system as shown in FIG. 1, and the third outlet 128c is fluidly coupled to the third output conduit 114c to supply the spout 6.

The pump 122 is arranged to increase the pressure of output flow from the mixer valve 118. The pump 122 may be provided where the control system 100 is to be supplied with a low pressure hot and/cold water supply (e.g. water from a cold/hot water storage tank, rather than a mains supply). The pump 122 is located downstream of a flow rate sensor (as discussed below) and before the shut off valves 124a, 124b, 124c. In other embodiments, a pump may be provided at any suitable point within the control and supply system to increase pressure if required. In yet other embodiments, the pump is absent. Such an embodiment is suitable for use where the supply pressure is adequate without it (e.g. where mains water pressure is provided, rather than water from a hot or cold water storage tank). Where the pump is not provided it may be replaced by a pipework manifold connecting the single output stream from the mixing valve to each of the outlets 128a, 128b, 128c via the shut-off valves.

The controller 120 is arranged to control operation of the various components of the control system 100. The controller 120 is in operative communication with the mixer valve 118, shut-off valves 124a, 124b, 124c, user interface 104, remote on/off control 106 and portable user device 116 by suitable wired or wireless connections. The controller 120 comprises one or more processors 140 and a memory 142 arranged to store computer readable instructions that may be carried out by the processor 140 in order to perform any of functions of the controller described herein. The controller further comprises a wireless communication module in the form of a Bluetooth module 144 and a WiFi module 146 arranged to allow wireless communication between the controller 120 and remotely located parts of the control system. The wireless communication module is further arranged to provide communication over the interne via a wireless local area network (Wi-Fi network), cellular network or any other suitable wireless network. The WiFi module may be a separate module connected to a main PCBA of the controller 120 by a wired connection as shown in FIG. 2. The WiFi module is mounted within the housing 132 in the described embodiment, but may be located remotely from the housing 132 in other embodiments. In yet other embodiments, the WiFi module 146 is located on the main PCBA of the controller.

The controller 120 further comprises a wired connection point 148 to which wired connections to other components of the mixer valve unit or control system 100 may be made. In the presently described embodiment only a single wired connection point 148 is shown. There may however be any suitable number (e.g. three) so that there are one or more wired connection points.

In the embodiment illustrated in FIG. 2, the processor 140 and memory 142 form a microcontroller (MCU) configured to carry out any of the functions of the controller described herein. In other embodiments, the controller may take different forms. The controller may comprise any combination of hardware and software that operates to control and process information and carry out programmed instructions. The controller may comprise any suitable processing circuitry including microprocessors, programmable logic devices, application specific integrated circuits (ASIC), application specific instruction set processors (ASIP) or the like. The controller 120 may be any device suitable for controlling the operations of the control system according to the functions defined herein (or additional functions) by processing information (e.g. information received from sensors, stored in local memory or received from an external source) and outputting instructions to components of the control system (e.g. the mixer valve and shut-off valves accordingly). In some embodiments, the controller 120 may be formed from distributed components, some or all of which may be located outside of the mixer valve unit 102. For example, the controller 120 may be located remotely from the housing 132, and may have a suitable wired or wireless connection with the components within the housing. In the described embodiment a single controller is provided to control a single mixer valve unit 102 in which a single mixer valve is included to provide blended water to water outlets of any number of ablutionary devices. In other embodiments, the controller may be arranged to control multiple mixer valve units 102, for example each having a separate mixer valve 118 and receiving separate hot and cold water supplies. For example, the controller 120 shown in FIG. 2 may control another mixer valve unit that is similar to that shown in FIG. 2, but without needing a second controller.

The control system further comprises one or more sensors that are arranged provide measurements of various operating parameters to the controller 120. Although not shown in FIG. 2, the sensors are operably coupled, either wired or wirelessly, to the controller 120 to send signals thereto.

The control system comprises output stream sensors arranged to generate output stream signals indicative of various water properties of the blended output stream of the mixer valve 118. In the embodiment illustrated in FIG. 2, the output stream sensors include an output temperature sensor 150 and output flow rate sensor 152. In other embodiments an output pressure sensor (not shown in the figures) may also be provided. These sensors are positioned to measure the properties of the water flow at any position downstream of the mixer valve 118 (e.g. downstream of the point where the blended stream is produced within the mixer valve, which may include within the mixer valve itself e.g. downstream of the valve member(s) controlling flow through the valve). They may be located within the mixer valve unit 102 as shown in FIG. 2. They may, for example, be between the mixer valve 118 and the pump 122 or manifold pipe work at which the output stream is divided. They may however be at any suitable position within the mixer valve unit. In other embodiments, they may be provided further downstream from the mixer valve unit.

The control system further comprises a first temperature sensor 154*a* arranged to generate a temperature signal indicative of the temperature of water flowing through or being supplied to the first water inlet 134 of the mixer valve. The first temperature sensor 154*a* may be located adjacent to the respective water inlet aperture of the mixer valve, or may be located further downstream at any point before the water flows are mixed within the mixer valve (it may therefore be within the mixer valve itself). The first temperature sensor may be located within the mixer valve unit 102 as shown in FIG. 2. The first temperature sensor may alternatively be located further upstream, and may be upstream of the mixer valve unit 102.

The control system further comprises a second temperature sensor 154*b* arranged to generate a temperature signal indicative of the temperature of water flowing through or being supplied to the second water inlet 136 of the mixer valve 118. The second temperature sensor 154*b* may be located adjacent to the respective water inlet aperture of the mixer valve, or may be located further downstream at any point before the water flows are mixed within the mixer valve (it may therefore be within the mixer valve itself). The second temperature sensor 145*b* may be located within the mixer valve unit 102 as shown in FIG. 2. The second temperature sensor may alternatively be located further upstream, and may be upstream of the mixer valve unit 102.

In the described embodiment, both a first and second temperature sensor are provided to measure temperature signals indicative of the temperature of the hot water supply or the cold water supply to the mixer valve 118. The first or second temperature sensors may measure either a hot water supply temperature signal or cold water supply temperatures signal, depending on which of the first and second inlet 134, 136 is being used to carry hot and cold water. In the described embodiment, the first temperature sensor 154*a* is a hot inlet temperature sensor measuring a hot temperature signal, and the second temperature sensor 154*b* is a cold inlet temperature sensor measuring a cold temperature signal. The user may select which inlet is which via a suitable user input once the system is connected.

In other embodiments, only one of the temperature sensors may be provided. In such an embodiment, the first and second inlets 134, 136 are configured to receive only one of a hot or cold water supply (e.g. they are not interchangeable).

In the described embodiment, the mixer valve comprises a valve position sensor 156 arranged to measure an actual valve position signal indicative of the actual position of the valve member or members within the mixer valve 118. The position of the valve members may be measured relative to the valve seat with which they are associated to provide feedback as to how much hot or cold water is being allowed to flow through the mixer valve 118. The valve position sensor 156 may be an encoder (e.g. a rotatory encoder) which may be any suitable type of inductive, magnetic, Hall Effect or resistive sensor. In other embodiments, a target position of the valve members may be relied on rather than a measured actual valve member position. In such an embodiment the valve position sensor 156 is not required and so is absent.

Any of the temperature sensors described herein may comprise a thermistor. Other types of temperature sensor may however be used such as a thermocouple, semiconductor sensor, infrared sensor or any other suitable sensor.

Any of the flow rate sensors described herein may comprise a flow turbine, ultrasonic sensor, pressure differential sensor or any other suitable type of flow rate sensor.

The position of the sensors shown in FIG. 2 is for illustration purposes only. The sensors may be located at any suitable position in order to provide the measurement of the desired properties of water flowing through the control system, or of the control system itself. Any of the sensors described herein are configured to produce a signal that is received by the controller and processed in order to carry out any of the functions described herein. The signals received by the processor may be converted to other formats for processing or storage by the processor.

The number and type of sensors provided in the control system is chosen according to the required functionality of the controller. In some embodiments, any one or more of the sensors shown in FIG. 2 may be absent if they are not required for certain functionality, e.g. if they are not required for the generation of a diagnostic or indicator signal according to any functions of the controller described herein.

The controller is configured to control the mixer valve 118 according to one or more target output water properties. By water properties we mean properties of water including its temperature, flow rate or pressure. The target output water properties are set by the user via the user interface 104 or via the portable remove device 116 using a suitable application running on that device, or may be defined by a shower program stored in the memory 142 of the controller. The controller is arranged to control the mixer valve in response to measurements from the output stream sensors so as to vary the flow of water through the mixer valve (e.g. through each flow control device with the mixer valve) to reach or maintain the desired target output water properties.

Figures 3, 4:
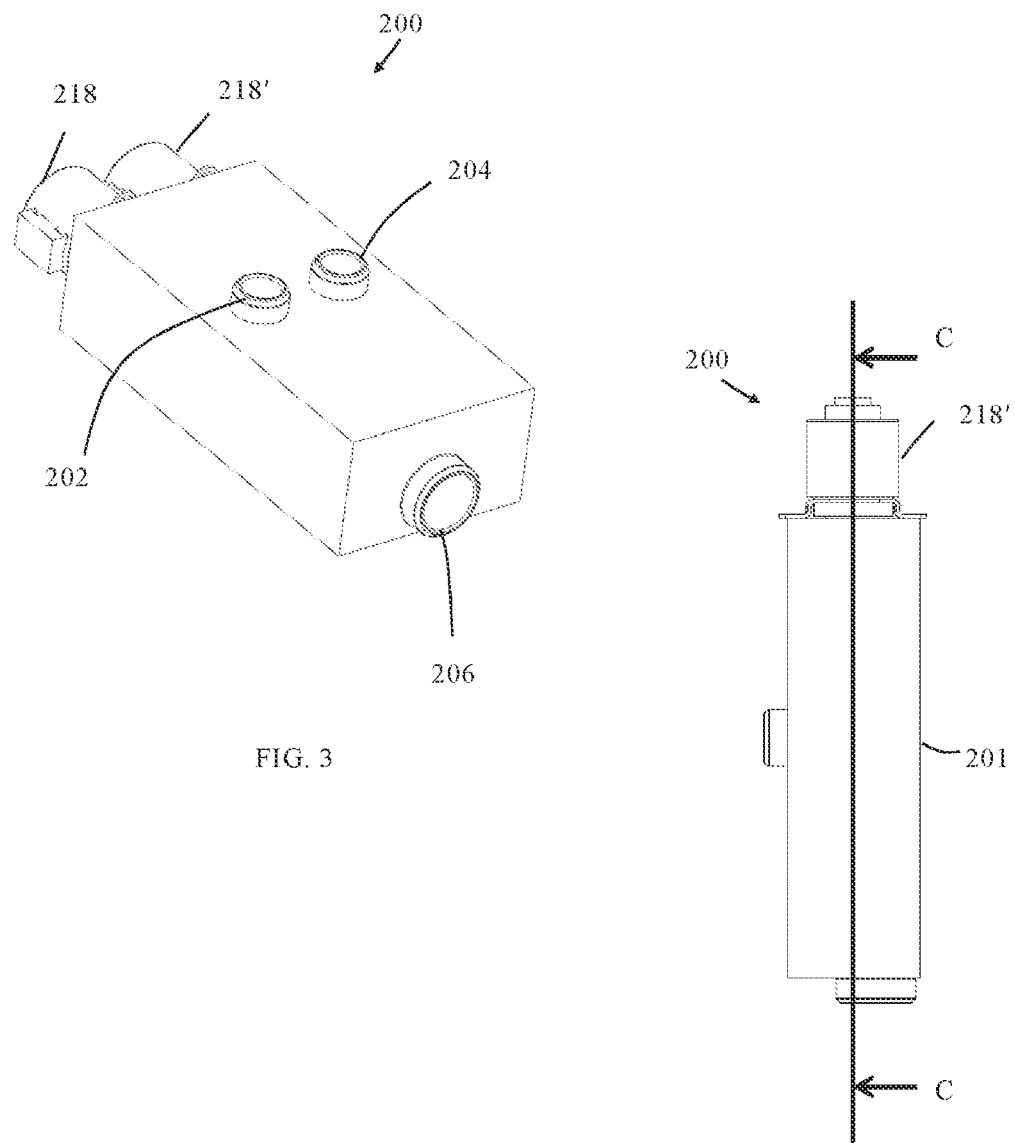
FIGS. 3 and 4 show a perspective and a side view of a mixer valve forming part of the mixer valve unit of FIG. 2.
Figure 5:
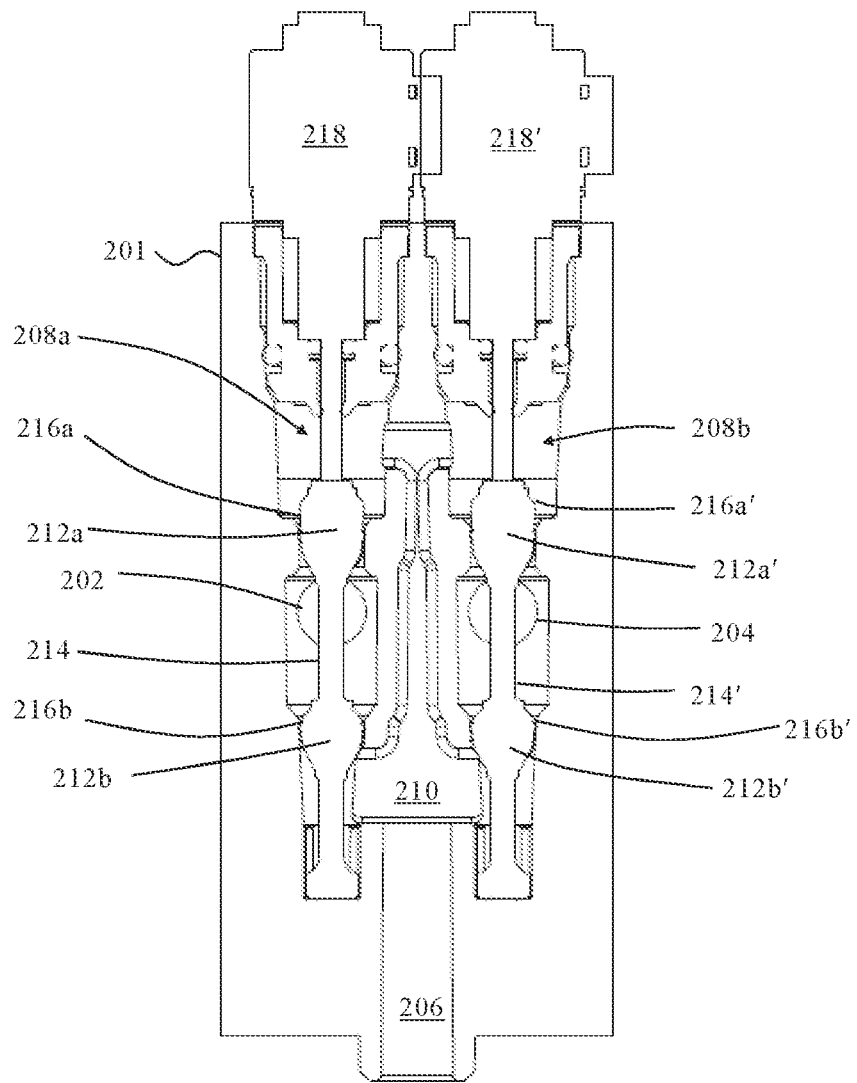
FIG. 5 shows a cross section through line CC marked in FIG. 4.

Referring now to FIGS. 3 to 5, an example of a mixer valve 200 suitable for use in the mixer valve unit 102 is shown in more detail. This is to be understood as only one example with alternative mixing valves that provide the desired controlled blending of hot and cold flows being apparent to the skilled person. The mixer valve 200 comprises a housing 201 having an aperture 202 forming a first water inlet and an aperture 204 forming a second water inlet. The housing 201 further comprises an aperture 206 to form an outlet.

The housing 201 houses a first flow control valve 208*a* and a second flow control valve 208*b*. The first flow control valve 206 is arranged to control the flow of water from the first inlet 202 to a mixing chamber 210. The second flow control valve 208 is arranged to control the flow of water from the second inlet 204 to the mixing chamber 210. From the mixing chamber 210 water flows to the outlet 206. The first and second flow control valves may control the flow of hot or cold water, depending on which if the first and second water inlets 134, 136 is connected to the hot or cold water supply.

As can be seen illustrated in FIG. 5, the first flow control valve 208*a* comprises a first valve member 212*a* and a second valve member 212*b* each mounted to a shaft 214. The valve members are arranged to seal against associated valve seats 216*a*, 216*b*. The shaft 214 is movable via an actuator 218. The second flow control valve 208*b* correspondingly comprises a first valve member 212*a*' and second valve member 212*b*' with associated valve seats 216*a*', 216*b*'. The valves members of the second flow control valve are mounted to a shaft 214' moved by an actuator 218'. The valve member controlling the flow of hot water is referred to herein as a hot valve member, and the valve member controlling the flow of cold water is referred to as a cold valve member. In some embodiments, only one valve member is provided for each of the first and second flow control valves. These may be referred to as first and second valve members elsewhere herein.

The actuators 218, 218' are adapted to control the linear position of the shafts 214, 214' and thus the position of the first and second valve members with respect to the valve seats. The actuators 218, 218' may each comprise a stepper motor coupled with a lead screw arranged to move the associated shaft 214, 214' linearly in an axial direction. Any suitable actuator for controlling linear motion of the shaft may be employed in place of the stepper motor including, but not limited to, linear actuators. The controller 120 is in communication with the actuators 118, 118' (e.g. via a wired connection) so that the flow of water through the valve can be controlled as described above. The controller may also be in communication with the valve member position sensor where provided.

The mixer valve shown in FIGS. 3, 4 and 5 is only one such example. It may, for example, be a mixer valve as described in International Patent Application No. PCT/IB2013/001646 (WO2013/190381) or PCT/GB2018/053122 (WO2019/092401), which are hereby incorporated by reference. In other embodiments, the mixer valve may comprise any suitable number of cooperating valve members and valve seats in order to control the flow of hot and cold water into a mixing chamber.

In any of the embodiments described herein the sensors provided in the mixer valve unit may instead be located remotely from the mixer valve unit whilst still being in communication with the controller 120. For example, the first and second temperature sensors could be provided further upstream, for example in the water supply conduits 108, 110 rather than being part of the mixer valve unit itself. Similarly the outlet temperature sensor could be located downstream of the mixer valve unit.

In some embodiments, the a user interface 104, and a remote on/off control 106 shown in FIG. 1 may not be provided as part of the control system 100 described or claimed herein. In such embodiments, user interaction may be provided only with the mobile device 116 or other form of wired or wireless interface. The control system described or claimed herein may therefore be the mixer valve unit 102 (including any internal or connected remotely located sensors).

Diagnostic Signal Generation

The controller of the present application is configured to generate a diagnostic signal that indicates a flow restriction or decay in flow rate has occurred over time as the ablutionary device(s) are used. The controller 120 is arranged to obtain one or more current (i.e. currently or presently occurring) operating signals that are related to operating parameters of the control system. The operating signals are directly or indirectly related to the flow rate of the blended stream produced by the mixer valve (e.g. the flow rate of the blended output stream generated by the mixer valve, or the position of the valve members that control the flow rate). Based on the obtained current operating signal or signals, the controller is configured to generate a diagnostic signal by performing a comparison to a corresponding historical expected operating signal. The historical operating signal is obtained previously by the controller. By historical we mean obtained at any point in time before the current operating signal e.g. during the same period of use of the ablutionary device, a separate previous period of use or an installation or calibration use. The historical operating signal is one that would be expected to be obtained as the current operating signal should no change in the operation of the ablutionary device have occurred. The comparison performed by the controller allows a change in the value of the operating signal over time to be detected, which provides an indirect indication that a decay in flow rate has occurred meaning a blockage or flow restriction is likely to be present.

The operating signals obtained by the controller can take a number of different forms according to different types of operating parameters. The operating parameters generally relate to information on a state of operation of the control system and/or the water flowing through it. The operating signal(s) may include a sensor signal indicative of water properties measured at respective points within the control system. Such sensor signals may be measured by the sensors provided in the control system described herein.

Diagnostic Signal Generation Based on Flow Rate Signal

The operating signal on which the comparison is based may be a flow rate signal obtained from the flow rate sensor 152. The controller 120 is configured to obtain a current flow signal from the flow rate sensor 152, which is configured to generate a flow rate signal indicative of the rate of flow of water flowing in the output stream produced by the mixer valve 118. The historical expected operating signal is then a historical expected flow rate signal obtained previously from the same sensor. The controller 120 is configured to compare the obtained current flow rate signal to a historical expected flow rate and generate a diagnostic signal based on the comparison. The controller 120 is configured to generate the diagnostic signal if the comparison indicates that the current flow rate is less, or less than a threshold proportion of, the expected historical flow rate (e.g. less than or less than 95% of the expected flow rate). This allows the controller to determine that a reduction in the flow rate has occurred compared to that expected, giving an indication that something is restricting the flow of water. This particular method (diagnostic signal generation based on flow rate signal) is advantageous in a system where the flow control is open-loop—i.e. flow is monitored, but not continually adjusted throughout the entire shower duration to maintain a constant flow rate. In can however also be used with a closed-loop flow control.

The controller is configured to obtain a suitable historical flow rate signal on which the comparison in based. The controller is arranged to store at least one flow rate signal that has been previously generated by the flow rate sensor to act as a historical flow rate signal in order to perform the comparison. The at least one historical flow rate may be stored locally in the controller memory 142, or remotely in any suitable storage accessible by the controller 120 so that it can be obtained. The controller may be further configured to store the current flow rate signal on which the comparison is based to act as a historical flow rate signal for later further comparisons.

The stored historical value can be compared to the current flow rate signal by the controller 120 in order to detect any change in flow rate that could have been caused by blockages being formed within the flow paths supplying the ablutionary devices preventing the expected level of flow rate in the output stream.

For example, a blocked filter or shower head could reduce the level of flow detected downstream of the mixer valve when compared to past use before the blockage had developed. This can therefore be detected by the controller and a suitable diagnostic signal generated so that appropriate action can be taken (see later). The reduction in expected flow rate can also provide an indication that the flow from the outlet of the ablutionary device (e.g. from the shower heads or over bath spout) has been deliberately restricted. This can happen if user installs a 'multi-mode', 'low-flow mode' or diverting outlet by which the user can alter the shower head mode (and therefore flowrate). Restriction to the flow can cause reduced thermal performance unless correctly accommodated by the controller or cleared. By comparing the current flow rate to past flow rates before any restriction the presence change made by the user can be identified and the appropriate action taken.

The at least one historical flow rate measurements on which the comparison is based is recorded at a known associated operating condition. The current flow rate signal also has an associated operating condition. The controller is arranged to compare a current flow rate signal with a historical flow rate signal that has the same or similar associated operating conditions. This allows a like for like comparison to be performed. The operating condition may include any relevant parameters of the control system or the water flowing through it, for example the actual or target position of the valve members within the mixer valve, input water temperatures, or target output temperature or flow rate.

A plurality of historical flow rate signals may be available to the controller (e.g. either stored in the memory of the controller or other suitable memory accessible by the controller). The plurality of flow rate signals may be associated with a range of operating conditions with which they are stored in association. The controller may be arranged to determine an operating condition corresponding to the current flow rate signal and obtain a suitable historical flow rate signal having the same or similar operating condition. This may be done by searching for a suitable historical flow rate signal from a database in which the plurality of historical flow rate signals are stored.

The historical flow rate signal(s) may include a flow rate measured during the installation and calibration of the control system and ablutionary device. This may provide a bench-mark of optimal operation to which later current flow rate measurements can be compared. This can also allow a flow restricting device retrofitted by the user after installation to be detected.

The historical flow rate signal(s) may additionally or alternatively include flow rate signals measured by the controller at various intervals during use of the ablutionary device. The controller is therefore arranged to log the current flow rate signal on which a comparison is being made, or otherwise obtained flow rate signal, to generate suitable historical flow rate signals for use in later comparisons. The historical flow rate signals may include signals measured during a previous use of the ablutionary device(s), or to flow rate signals measured within the same period of use. The latter of these may allow a restricting in flow by the user while they are using the shower to be detected.

Diagnostic Signal Generation Based on Valve Member Target or Actual Position

In addition or alternatively to the flow rate signal comparison described above, the diagnostic signal may instead be based on a current target or actual position of the first, second or both of the valve members. As discussed above, the controller 120 is configured to control the mixer valve 118 in order to achieve certain target output water properties (e.g. temperature, flowrate). In order to do this, the controller 120 adjusts the position of the valve members of the first and second flow control valves 208a, 208b relative to the respective valve seats in order to control the flow of water. In order to control the output blended stream, the controller 120 is configured to generate a target position used to set the position of each of the valve members. The target position is based on a comparison between the target water output property or properties (e.g. set by the user or required by a shower program) and the output stream signal measured by the output stream sensor(s). An actual position of the valve members may be determined using the valve position sensor 156 described above, rather than using the target position set by the controller.

This method (diagnostic signal generated based on valve member target or actual position) may advantageously be utilised in a system that has a closed-loop flow control i.e. the valve members are continually adjusted to maintain a constant user defined output flow (as well as temperature). In can however also be used with an open-loop flow control.

The one or more operating signals on which the diagnostic signal generation is based may include a current target or actual position of the first (e.g. valve members 121a and/or 212b in FIG. 5), second (e.g. valve members 212a' and/or 212b') or both of the first and second valve members. The historical expected operating signal is then a corresponding historical expected target or actual position of the first, second or both of the valve members. The controller is configured to generate the diagnostic signal if the comparison indicates that the flow control valves 208a, 208b are currently open more than, or greater than a threshold amount more than, at the corresponding historical expected target or actual positions of the valve members (e.g. the valve members are further from the respective valve seats than expected). The diagnostic signal may be generated if the valve members are open more than a threshold amount greater than expected. This helps reduce false positives if only a small difference between the current and historical value is present.

If one or both of the flow control valves 208a, 208b are open a greater amount than expected, this may indicate that a blockage has occurred causing a reduced flow rate. If a blockage or restriction has occurred the controller 120 may open the flow control valves a greater amount compared to when the blockage was not there. By detecting a difference between the current and historical position of the valve members the flow blockage/restriction may be detected in a similar way to using the more direct flow rate measurement described above.

Any of the features in the previous section described in relation to the flow rate signal may apply equally to when the operating signal is based instead on a valve member or members target or actual position (and vice versa). For example, the target or actual positions of the valve member (s) may similarly be stored (locally or remotely) by the controller for use in comparisons, including the current value on which a comparison is based. The comparison may also be performed using valve member positions having corresponding operating conditions of the control system in the same way as the flow rate comparison, and may involve searching for a matching operating condition from a database storing a plurality of operating conditions (either flow rate and/or valve member positions) at various operating conditions. The valve member positions may similarly relate to those present when the ablutionary device was installed and calibrated, or at any other point in time before the current value is obtained.

Action in Response to Diagnostic Signal Generation

Once the diagnostic signal has been generated by any one or more of the methods defined herein the controller 120 may control the operation of the ablutionary device or devices to which it supplies water in response. In one embodiment, the controller 120 is configured to control the mixer valve 118 in response to the diagnostic signal. In this embodiment, the controller is configured to at least temporarily reduce the flow rate or target flow rate of hot and/or cold water flowing through the mixer valve 118 in response to the diagnostic signal to ensure that optimal thermal performance can still be provided. This may be done by moving the valve member positions within the mixing valve 118 towards their respective closed positions.

The controller may be arranged to change the one or more target output water properties by which the water output is being controlled in response to the diagnostic signal. For example, the temperature or flow rate set point may be adjusted to account for the restricted flow.

In the embodiment illustrated in FIGS. 1 and 2 the controller 120 is further configured to send the diagnostic signal to the user interface 104 and/or the remote device 116 for display to the user and/or storage. An indication of the response carried out by the controller based on the diagnostic signal may also be sent and displayed to the user.

This may inform the user that a reduction in expected flow rate has been detected. This information can be used to pre-warn users that a service is due (preventative maintenance) or that they should clean or unblock any filters. It may also indicate to the user that they should remove any retrofitted restriction device as it is causing a loss of performance. The diagnostic signal may also act as warning that the plumbing system used to supply water to the control system may have a reduced pressure. The controller 120 is configured to send the diagnostic signal via the wireless communication module (e.g. via Bluetooth or WiFi network) or via a wired connection.

The controller 120 may be further arranged to send the diagnostic signal (and/or controller response information) to a remote location such as a servicing centre via the interne. The diagnostic signal may be sent to a remote server system for suitable processing. This may allow the performance of the shower system to be monitored remotely by its manufacturer or a servicing company. This allows a third party such as the manufacturer/servicing company to determine that a service is due or it is not the shower control system (or the shower) which is at fault and causing any lack of performance, but rather a blocked filter or restriction device retrofitted by the user.

The diagnostic signal may also be stored in the memory 142 of the controller so that it can be accessed at a later date or form part of a performance log. This can be displayed to the user or communicated to the manufacturer/service company.

Figure 6:
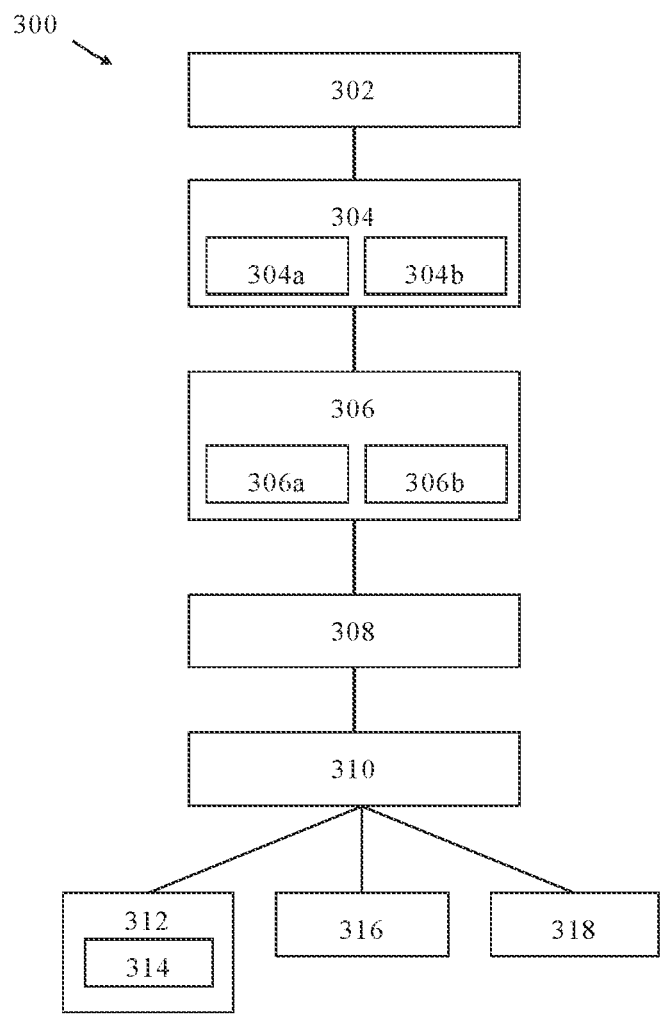
FIG. 6 shows a method performed by a control system according to an embodiment.

Referring to FIG. 6, a method 300 performed by a control system of an ablutionary device or devices is illustrated. The control system and ablutionary devices may be as defined in connection with any other embodiment described herein. As described above, the control system comprises a mixer valve having a first water inlet configured to receive a supply of one of hot or cold water, a second water inlet configured to receive a supply of the other of hot or cold water, and an outlet configured to output cold water, hot water or a mixture thereof as an output stream for suppling water to the ablutionary device downstream of the mixer valve. The mixer valve comprises first and second valve members forming first and second flow control valves arranged to control flow between the inlets and the outlet as previously described. The method 300 may comprise steps to perform any of the functions of the control system 100 (e.g. functions of the controller 120) as defined elsewhere herein.

The method 300 comprises obtaining 304 one or more current operating signals relating to an operating parameter of the control system. Once the current operating signal is obtained, the method 300 comprises comparing 306 the one or more current operating signals to a corresponding historical operating signal. Following this the method comprises generating 308 a diagnostic signal based on the comparison. As discussed above, the current operating parameter is compared to a historical value to determine if flow restriction or blockage is present.

The current and historical operating signals may take a number of different forms. In the presently described embodiment, the one or more current operating signals include a current flow rate signal indicative of the rate of flow of water flowing in the output stream and the historical expected operating signal is a historical expected flow rate signal. The method 300 comprises obtaining 304a a current flow rate signal that is indicative of the rate of flow of water flowing the output stream of the mixer valve. As discussed above, this is obtained from the output flow sensor 150.

Once the current flow rate signal is obtained, the method 300 comprises comparing 306a the current flow rate signal to a historical expected flow rate signal. Following this, the method comprises generating 308 a diagnostic signal based on the comparison. The diagnostic signal may be generated using any of the methods described elsewhere herein. For example, the diagnostic signal is generated if the comparison indicates that the current flow rate is less than, or less than a threshold proportion of, the expected historical flow rate.

In the presently described embodiment, the one or more current operating signals further include a target or actual position of the first, second or both of the valve members provided in the flow control valves, and the historical expected operating signal is a corresponding historical expected target or actual position of the first, second or both of the valve members. The method obtaining step 304 may therefore comprise obtaining 304b a target or actual position signal of the valve member(s). The target position of the valve members may be obtained from that set in order to control the operation of the mixer valve to reach the desired output water properties. Additionally or alternatively, an actual position signal may be obtained from the valve position sensor 156. The comparing step 306 may further comprise comparing 306b the current actual/target valve member position(s) to the corresponding historical value. The diagnostic signal is generated 308 based on this comparison as described elsewhere herein. For example the diagnostic signal is generated if the comparison indicates that the first, second or both flow control valves are currently open more than (or greater than a threshold amount more than) at the corresponding historical expected target or actual valve member positions.

The historical operating signal (i.e. the historical flow rate signal or target/actual valve member position) may be obtained from a local or remote storage from which it is accessible by the controller. In the present embodiment, the method 300 comprises a step of storing 302 at least one historical operating signal (at least one flow rate signal or valve member target/actual position) to act as the historical operating signal. As can be seen in FIG. 6, this storing step takes place before the current operating signal(s) is obtained. As discussed previously, the historical expected operating signal on which the comparison is based may be measured or otherwise set or obtained during the installation and/or calibration of the control system and ablutionary device, or at any other point in time during operation of the ablutionary device before the current value is obtained.

The method 300 further comprises storing 310 the current operating signal on which the comparison is based to act as a historical expected operating signal. This means that it can be obtained for use in later comparisons. In other embodiments this step may be omitted, or may be performed for only some operating signals.

As discussed above, the current operating signal has an associated operating condition, and the comparing 306 comprises comparing the current operating signal with a historical operating signal that has the same or similar associated operating condition. The method may therefore further comprise searching for a historical operating signal that has a matching (i.e. the same or similar) associated operating condition in a database of a plurality of historical operating signals having various associated operating conditions.

Referring again to FIG. 6, the method 300 further comprises controlling 312 the mixer valve in response to the diagnostic signal generated in step 308. Controlling 312 the mixer valve in response to the diagnostic signal comprises controlling 314 the mixer valve to at least temporarily reduce or otherwise adjust the flow rate, or target flow rate, of hot and/or cold water through the mixer valve in response to the diagnostic signal.

In addition, or alternatively, to being used to provide further control of the control system, the diagnostic signal may be stored, displayed or transmitted as described above. The method 300 further comprises sending 316 the diagnostic signal to the user interface and/or a remote device for display and/or storage. The diagnostic signal may also be sent to the manufacturer or service company to aid with advising the user on how to remedy problems with the shower. The diagnostic signal may be sent to a remote server system for suitable processing. The diagnostic signal can be sent via a wireless connection (e.g. Bluetooth or WiFi network) or via a wired connection as already described.

Finally, the method comprises storing 318 the diagnostic signal in a local memory. This may allow the diagnostic signal to be used as part of a performance log, or accessed by the user or an engineer performing a service.

While the method 300 illustrated in FIG. 6 includes various steps performed in response to or using the diagnostic signal, in some embodiments any of these steps may be omitted or combined in any combination. While FIG. 6 shows the diagnostic signal generation being based on both the flow rate and valve member position in some embodiments it may be based on only one of these. For example, in some embodiments, the steps 304a and 306a related to the flow rate may be omitted. Alternatively, the steps 304b and 306b related to the valve member position may be omitted.

Various modifications will be apparent to the skilled person without departing form the scope of the claims. The embodiments described above should be understood as exemplary only. Any feature of any of the aspects or embodiments of the disclosure may be employed separately or in combination with any other feature of the same or different aspect or embodiment of the disclosure and the disclosure includes any feature or combination of features disclosed herein.

While the embodiments of the present application as described in connection with an electronically controlled ablutionary device (e.g. a digital shower), the invention is not limited to only those embodiments. The control system described or claimed herein may be suitable for use with a manually operated shower in which only the flow rate sensor is provided and any other sensors required to determine the operating conditions based on which suitable historical flow rate signals are obtained.

What is claimed is:

1. A control system for one or more ablutionary devices, comprising:
   a mixer valve having a first inlet and a second inlet configured to receive a supply of hot and cold water, and an outlet configured to output cold water, hot water, or a mixture thereof as an output stream for supplying water to the one or more ablutionary devices downstream of the mixer valve, wherein the mixer valve comprises first and second valve members forming first and second flow control valves arranged to control flow between the inlets and the outlet; and
   a controller configured to:
      control the mixer valve during use according to one or more target output water properties of the output stream, the one or more target output water properties being set by the user of the one or more ablutionary devices, by controlling the position of the valve members in order to control the output stream;
      obtain two or more current operating signals related to a flow rate of the output stream produced by the mixer valve, the one or more operating signals including a current target or current actual position of both of the valve members;
      compare each of the two or more current operating signals to a corresponding historical operating signal, the historical operating signal being an operating signal previously obtained by the controller, the corresponding historical operating signal being a corresponding historical target or actual position of both of the valve members; and
      generate a diagnostic signal based on the two or more comparisons;
   wherein after the diagnostic signal is generated, the controller:
      transmits the diagnostic signal to at least one of a user interface and a remote device, and
      adjusts the flow rate of the output stream based on the generated diagnostic signal.

2. The control system of claim 1, further comprising a flow rate sensor arranged to generate a flow rate signal indicative of the rate of flow of water flowing in the output stream, wherein the two or more current operating signals include a current flow rate signal obtained from the flow rate sensor and the corresponding historical operating signal is a historical flow rate signal previously obtained from the flow rate sensor.

3. The control system of claim 2, wherein the controller is configured to generate the diagnostic signal if the two or more comparisons indicate that the current flow rate is less than, or less than a threshold proportion of, the historical flow rate.

4. The control system of claim 1, wherein the controller is configured to generate the diagnostic signal if the two or more comparisons indicate that the first, second, or both control valves are currently open more than, or greater than a threshold amount more than, at the corresponding historical target or actual positions of the valve members.

5. The control system of claim 1, wherein the controller is arranged to store at least one operating signal to act as a historical operating signal in order to perform the two or more comparisons.

6. The control system of claim 5, wherein the controller is configured to store the current operating signal on which the two or more comparisons are based to act as a historical operating signal for use in later comparisons.

7. The control system of claim 1, wherein the current operating signal has an associated operating condition, and wherein the controller is arranged to compare a current operating signal with a historical operating signal that has the same or similar associated operating condition.

8. The control system of claim 1, wherein the historical operating signal on which the two or more comparisons are based relates to operation of the ablutionary device during the installation and/or calibration of the control system and ablutionary device.

9. The control system of claim 1, wherein the controller is further configured to control the mixer valve in response to the diagnostic signal.

10. The control system of claim 9, wherein the controller is arranged to control the mixer valve to at least temporarily reduce the flow rate or target flow rate of hot and/or cold water through the mixer valve or change the one or more target output water properties in response to the diagnostic signal.

11. The control system of claim 1, wherein the controller is further configured to send the diagnostic signal to a user interface and/or a remote device for display and/or storage.

12. The control system of claim 1, wherein the controller further comprises a memory, and the controller is arranged to store the diagnostic signal in the memory.

13. A method performed by the control system of an ablutionary device, the control system comprising a mixer valve having a first inlet and a second inlet configured to receive a supply of hot and cold water, and an outlet configured to output cold water, hot water, or a mixture thereof as an output stream for supplying water to the one or more ablutionary devices downstream of the mixer valve, wherein the mixer valve comprises first and second valve members forming first and second flow control valves arranged to control flow between the inlets and the outlet, the method comprising:
controlling the mixer valve during use according to one or more target output water properties of the output stream, the one or more target output water properties being set by the user of the one or more ablutionary devices, by controlling the position of the valve members in order to control the output stream;
obtaining two or more current operating signals related to the flow rate of the output stream produced by the mixer valve, the one or more operating signals including a current target or current actual position of both of the valve members;
comparing each of the two or more current operating signals to a corresponding historical operating signal, the historical operating signal being a previously obtained operating signal, the corresponding historical operating signal being a corresponding historical target or actual position of both of the valve members; and
generating a diagnostic signal based on the two or more comparisons;
wherein after the diagnostic signal is generated, the controller:
transmits the diagnostic signal to at least one of a user interface and a remote device, and
adjusts the flow rate of the output stream based on the generated diagnostic signal.

14. The method of claim 13, wherein the two or more current operating signals include a current flow rate signal indicative of the rate of flow of water flowing in the output stream and the corresponding historical operating signal is a historical flow rate signal.

15. The method of claim 14, wherein the diagnostic signal is generated if the two or more comparisons indicate that the current flow rate is less than, or less than a threshold proportion of, the historical flow rate.

16. The method of claim 13, wherein the diagnostic signal is generated if the two or more comparisons indicate that the first, second, or both flow control valves are currently open more than, or greater than a threshold amount more than, at the corresponding historical target or actual valve member positions.

17. The method of claim 13, further comprising storing at least one operating signal to act as a historical operating signal in order to perform the two or more comparisons.

18. The method of claim 17, wherein storing at least one operating signal comprises storing the current operating signal on which the two or more comparisons are based to act as a historical operating signal for use in later comparisons.

19. The method of claim 13, wherein the current operating signal has an associated operating condition, and wherein comparing the two or more current operating signals comprises comparing a current operating signal with a historical operating signal that has the same or similar associated operating condition.

20. The method of claim 13, wherein the historical operating signal on which the two or more comparisons are based relates to operation of the ablutionary device during the installation and/or calibration of the control system and ablutionary device.

21. The method of claim 13, further comprising controlling the mixer valve in response to the diagnostic signal.

22. The method of claim 21, wherein controlling the mixer valve comprises controlling the mixer valve to at least temporarily reduce the flow rate or target flow rate of hot and/or cold water through the mixer valve or change the one or more target output water properties in response to the diagnostic signal.

23. The method of claim 13, further comprising any one or more of:
sending the diagnostic signal to a user interface and/or a remote device for display and/or storage; and
storing the diagnostic signal in a local memory of the controller.

* * * * *